E. P. BODEN.
STUMP EXTRACTOR.
APPLICATION FILED FEB. 9, 1911.
1,075,008.
Patented Oct. 7, 1913.
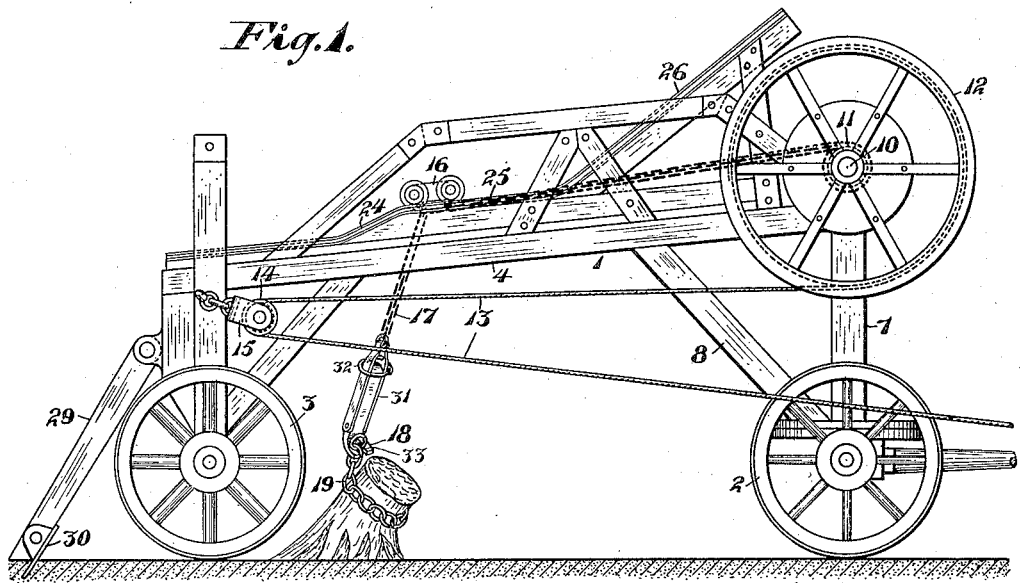
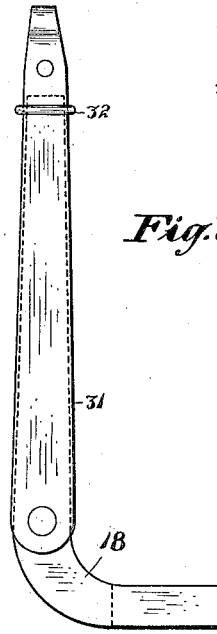
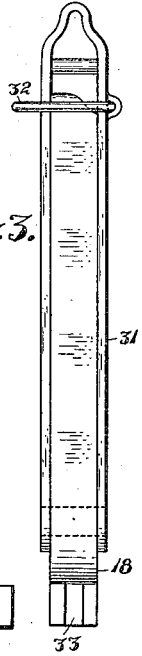
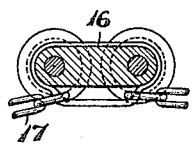
WITNESSES
F. C. Fliedner
N. B. Keating
INVENTOR
Ed. P. Boden
By F. M. Wright
Attorney.

UNITED STATES PATENT OFFICE.

EDMUND P. BODEN, OF SANTA CLARA, CALIFORNIA.

STUMP-EXTRACTOR.

1,075,008.  Specification of Letters Patent.  Patented Oct. 7, 1913.

Application filed February 9, 1911. Serial No. 607,543.

*To all whom it may concern:*

Be it known that I, EDMUND P. BODEN, a citizen of the United States, residing at Santa Clara, in the county of Santa Clara and State of California, have invented new and useful Improvements in Stump-Extractors, of which the following is a specification.

The present invention relates to an improved apparatus for extracting stumps.

One object of the invention is to provide an apparatus of this character, which, while of great power and readily and quickly movable from one stump to another, will be comparatively small and compact in form. In my former invention of stump extractor, patented Feb. 15, 1898, No. 599,217, in order to obtain the desired power to extract the stump, the apparatus was made of such great length, that the movement of the apparatus in extracting one stump would generally bring it into proximity to another stump. Also the great length of the apparatus rendered it slow and unwieldly in turning. For both of these reasons the vehicle could not be moved as rapidly as was desirable from one stump to another.

One object of my present invention is to reduce the length of the apparatus about one-half, while still maintaining it of sufficient power. Again, it is extremely important that the stump when extracted should not be returned to the hole from which it was extracted, but should be laid on the ground at the side of the hole. With my former stump extractor to accomplish this result the stump was dragged out of the hole nearly horizontally.

A further object of my present invention, is to provide an apparatus by which the stump is drawn from the ground vertically or nearly so, and then laid upon the ground at the side of the hole.

In the accompanying drawing, Figure 1 is a side view of the apparatus; Fig. 2 is a longitudinal section of the carriage; Fig. 3 is an edge view of a tripping hook employed therein; Fig. 4 is a side view of said hook.

Referring to the drawing, 1 indicates the body of a vehicle mounted upon front wheels 2 and rear wheels 3, the latter being constructed of great strength to withstand the stress thereon. The body of the vehicle comprises a bed 4 inclined upwardly from rear to front, the upper end of said bed being supported by an upright frame 7 and an oblique brace 8 connected at its lower end to said frame, said frame being connected by the usual turn plate or king bolt, to the axle of the front wheels. Said bed is suitably braced by a truss 9 on each side to enable it to withstand the strain of pulling the stump. Upon the front end of said bed, immediately over said frame, are mounted bearings for a shaft 10 of a drum 11, shown in dotted lines in Fig. 1, said shaft carrying a pull wheel 12. A cable 13 is wound around said pull wheel and extends around a pulley 14 in a block 15 connected to the side of the body of the vehicle adjacent to one of the rear wheels. Said cable then extends to any suitable location where it can be attached to a draft device (not shown) pulled by a team of horses. The movement of the horses thus causes the drum to be rotated. Around said drum is wound a chain which is connected to a carriage 16 from which carriage extends a chain 17, at the lower end of which is suspended a trip hook 18, which can be hooked to a chain 19 bent around the stump to be extracted. Said carriage moves upon an inclined track, the angle of inclination of which varies greatly at different points thereof. At the rear terminal portion 23, on which the carriage 16 is located at the beginning of the operation, the slope is small. At a succeeding portion 24 of said track it is comparatively steep. Upon the first movement of the horses the carriage travels up the portion 24 of the track to take up the slack in the chain. At a succeeding portion 25 of the track the slack in the chain has been fully taken up, and the great strain upon the chain due to the resistance of the stump begins, and it is therefore important that the inclination of this portion of the track should be very gradual, as shown. During the movement of the carriage along this portion 25 of the track, the stump is extracted to such an extent that, when the carriage arrives at the end of said portion, the stump offers little resistance to its further extraction, the power required being only that necessary to break comparatively small roots of the stump, which remain in the ground, and therefore in the remaining portion 26 of the track the inclination is much steeper. At the end of this portion of the movement of the carriage the stump is fully extracted and raised above the ground.

The above described forward movement of the horses has a tendency to move the vehicle rearwardly. Any suitable means such as chuck blocks placed behind the rear wheels may be employed to prevent this rearward movement, but I prefer to employ followers 29 since these have the additional advantage of removing part of the strain upon the axle. The upper ends of said followers are pivoted to the rear end of the body of the vehicle, while the lower ends drag along the ground and are provided with shoes 30 adapted, upon the rearward movement of the apparatus, to enter the ground and prevent further rearward movement.

The above mode of operation will be sufficient for extracting in succession a number of stumps of ordinary size and resistance. But in case the stump is too large or too firmly rooted to be extracted in this manner, then the followers 29 are raised from the ground. A forward pull upon the cable 13 by the horses will then have the effect of moving the machine rearwardly over the stump, and the part 25 of the track will move under the carriage 16 until the chain 17 assumes a vertical direction. A continued rearward movement of the carriage under the action of the forward draft of the cable 13 will then cause the track to act as a wedge, exerting a very powerful lifting action on the chain, which will be sufficient to break the main roots and thus reduce the resistance of the stump so that the stump can be finally extracted by the movement of the carriage 16 upon the part 26 of the track. When the carriage reaches said part 26, and as soon as the resistance to the rearward movement of the vehicle is greater than the resistance which the stump offers to extraction the carriage will ride up the part 26, and the stump will be moved horizontally as well as upward out of the hole, so that it can be deposited upon the ground to one side of the hole from which it was extracted. When the chain 19 is removed from the stump and the cable 13 is released from the double tree, the carriage 16 runs back down the track 26 with considerable momentum, and at the same time the pulley 12 is rotated to rewind the cable 13 thereon, ready for a succeeding operation for another stump.

The trip hook 18 is pivoted to, and extends within, a yoke 31 being maintained in its operative position by a link 32 around said yoke and an end of said hook. The other end of the hook is formed with a recess 33 to engage the chain.

I claim:—

1. A stump extractor comprising a vehicle having front and rear wheels, and capable of rearward movement, a longitudinal track carried thereby sloping upwardly from the rear to the front end, a carriage on said track, power-multiplying means supported on said vehicle at the front end of the track, a chain provided with means for attachment to a stump and suspended from said carriage, a chain connecting said carriage with the load end of said power-multiplying means, and a cable extending from the power end of said power-multiplying means to a point in front of the vehicle.

2. A stump extractor comprising a vehicle, an upwardly sloping longitudinal track carried thereby comprising in order, a rear portion of small slope, a comparatively steep portion, upon which the carriage travels to take up the slack in the chain, a succeeding portion of small slope, and a forward steep terminal portion, a carriage on said track, a device constructed for attachment to a stump and carried by said carriage, a power-multiplying device supported upon said vehicle at the end toward which said track slopes upwardly, means for operating said power-multiplying device, and a connection therefrom to said carriage.

In testimony whereof I have hereunto set my hand in the presence of two subscribing witnesses.

EDMUND P. BODEN.

Witnesses:
 FRANCIS M. WRIGHT,
 D. B. RICHARDS.

---

Copies of this patent may be obtained for five cents each, by addressing the "Commissioner of Patents, Washington, D. C."